United States Patent [19]
Alvis

[11] 3,995,121
[45] Nov. 30, 1976

[54] TELEPHONE INTERCONNECTED PAGING SYSTEM WITH DIAL CLICK TO PULSE CONVERTER

[75] Inventor: Royal F. Alvis, Staten Island, N.Y.

[73] Assignees: Royal P. Alvis; Anthony J. Marraccini, both of New York, N.Y.

[22] Filed: Jan. 24, 1975

[21] Appl. No.: 543,786

Related U.S. Application Data

[60] Division of Ser. No. 481,254, June 20, 1974, abandoned, which is a continuation of Ser. No. 239,053, March 29, 1972, abandoned.

[52] U.S. Cl. .......................... 179/16 EA; 179/5.5; 179/6 C; 179/18 BF
[51] Int. Cl.² ........................................ H04Q 1/36
[58] Field of Search .............. 179/18 BF, 5 P, 41 A, 179/90 BB, 6 C, 6 D, 6 E, 5.5, 16 E, 16 EA, 16 EC; 325/16, 55, 64; 340/311, 312

[56] References Cited
UNITED STATES PATENTS

| | | | |
|---|---|---|---|
| 2,941,043 | 6/1960 | Ham, Jr. et al. | 179/6 D |
| 2,953,647 | 9/1960 | Johanson | 179/90 BB |
| 2,998,489 | 8/1961 | Riesz | 179/6 C |
| 3,087,999 | 4/1963 | Stewart et al. | 179/41 A |
| 3,312,784 | 4/1967 | Draper | 179/16 E |
| 3,315,039 | 4/1967 | Gebhardt et al. | 179/16 EC |
| 3,430,002 | 2/1969 | Roscoe | 179/16 EC |
| 3,461,241 | 8/1969 | Menke | 179/5 P |
| 3,879,583 | 4/1975 | Rooks | 179/16 E |

OTHER PUBLICATIONS

"Radio Paging Systems", Telephony, Ray Blain, Aug. 5, 1967, pp. 20, 26, 41 and 42.

Primary Examiner—Kathleen H. Claffy
Assistant Examiner—Randall P. Myers
Attorney, Agent, or Firm—Lane, Aitken, Dunner & Ziems

[57] ABSTRACT

A telephone paging system includes a central interconnect station responsive to phoned information for automatically transmitting the caller's verbal message to a designated portable paging receiver. The central station instructs the caller by means of a prerecorded message to provide a brief voice message preceded by touch tone or rotary dial digits identifying the receiver to be paged. The paging code digits and message are both tape-recorded by the central station. If the transmitter is free, the recorded paging code is automatically played back through a decoding circuit responsive to rotary dial clicks as well as touch tones. The output of the decoding circuit keys a radio transmitter which transmits a corresponding code followed by the recorded voice message. The central station employs a plurality of recorders. If one recorder is in operation, an incoming call is transferred to the next recorder. Recordings awaiting access to the transmitter are taken in a predetermined order.

24 Claims, 8 Drawing Figures

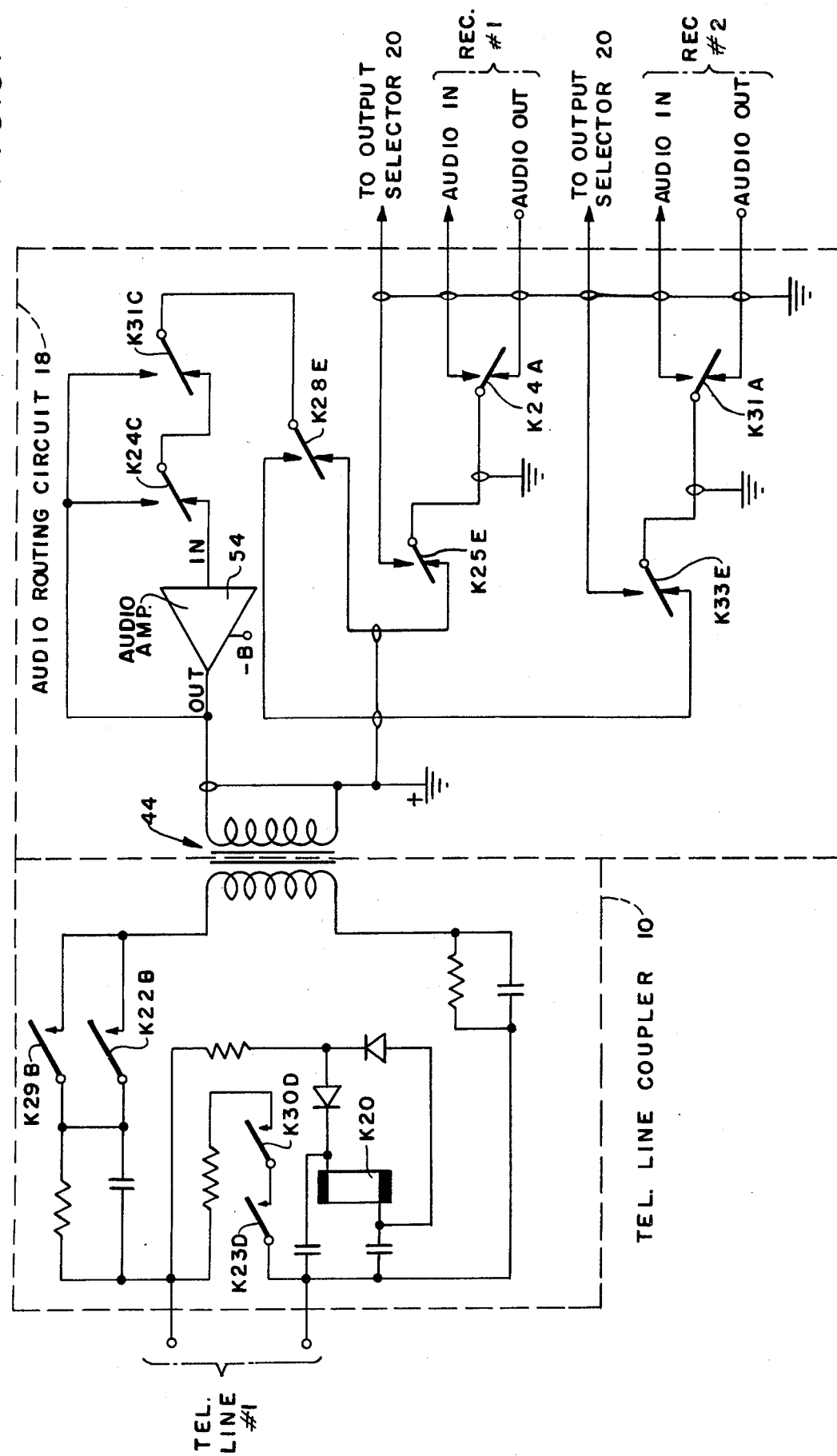

TELEPHONE INTERCONNECTED PAGING SYSTEM WITH DIAL CLICK TO PULSE CONVERTER

This is a division of application Ser. No. 481,254 filed June 20, 1974 and now abandoned, which is in turn a continuation of Ser. No. 239,053 filed Mar. 29, 1972 and now abandoned.

BACKGROUND OF THE INVENTION

The invention relates generally to the field of telephone interconnected paging systems, and more particularly to improved systems for relaying phoned messages to designated paging receivers.

Radio paging systems are gaining acceptance in a variety of areas. For example, in hospitals a paging system is useful for contacting doctors anywhere on the premises without broadcasting the page over loudspeakers. A small paging receiver, such as the "Pageboy" (Trademark) unit marketed by Motorola, Inc., is worn or carried by each individual to be paged. The paging receiver emits an audible alerting signal in response to a corresponding radio signal transmitted from a central station.

Radio paging systems are divided into two basic types: those which require an operator and those which operate automatically. In the manned systems, an outside caller phones the operator who takes the caller's message, looks up the paging number of the person for whom the message is intended, and then contacts the designated paging receiver with the transmitter. After the receiver emits an audible tone, the individual must call the operator to learn the reason he is being paged. Alternatively, the operator may repeat the caller's message through the transmitter if the paging receiver is adapted for audio reception.

In prior automatic paging systems, the central station is equipped with TOUCH TONE logic circuitry and a paging encoder which causes the paging signal to be transmitted automatically to the receiver in response to a supplementary multidigit paging number keyed to the caller. This system is referred to as telephone interconnected dialing or "end-to-end" signalling. In some prior art automatic systems, the central station transmits the caller's voice message, as it is given, directly to the receiver after contact is established.

These prior art systems all lack the flexibility required to handle automatically and efficiently a number of simultaneously incoming calls for different paging receivers. Moreover, automatic telephone interconnected paging systems in the past have required TOUCH TONE operation by the caller. The majority of personal phones now in use have the traditional rotary dial. Although during dialing there is a DC (direct current) connection between the caller's phone and the telephone company exchange, the subsequent connection to the called phone (herein the central station) is by inductive circuits which do not permit normal transmission of DC pulses from the rotary dial.

SUMMARY OF THE INVENTION

Accordingly, the general purpose of the invention is to improve telephone interconnected paging systems. One of the specific objects of the invention is to enable the central station to receive paging code information in the form of TOUCH TONES or inductively transmitted dial clicks. Another object of the invention is to handle automatically a number of simultaneous incoming calls for different paging receivers in a system employing a single transmitter. A further object of the invention is to convert inductively transmitted dial clicks to DC pulses for operating a paging encoder. Still another object of the invention is to achieve compatibility between dial click and TOUCH TONE decoders. And another object of the invention is to enable a caller to leave a paging code and voice message with the central station even though the transmitter is temporarily unavailable.

These and other objects are achieved by the telephone paging system disclosed herein which includes a central interconnect station responsive to phoned information for automatically transmitting the callers's recorded verbal message to a designated portable paging receiver. When the central station receives a call from an ordinary telephone, the caller is instructed by means of a pre-recorded message to provide a brief voice message preceded by TOUCH TONE or rotary dial digits identifying the receiver to be paged. The paging code digits and message are both tape recorded by the central station. A master control unit operates a plurality of tape recorders. If one recorder is in operation recording or playing back information, an incoming call is automatically transferred to the next recorder. The paging code digits and message are both tape recorded by the same recorder at the central station. If the transmitter is free, the recorded paging code is automatically played back through a decoding circuit having a dial-click-to-pulse converter as well as a conventional TOUCH TONE decoder. The output of the decoding circuit is translated by an encoder circuit into a corresponding tone code sequence which is transmitted by a radio transmitter. The recorder is stopped during code transmission. Following contact with the paging receiver, the recorded voice message is played back over the transmitter. Recordings awaiting access to the transmitter are taken in a predetermined order by an automatic recorded output selector. The capacity of the system may be expanded by employing a number of phone lines having automatic call transferring capability.

When the caller uses a conventional rotary dial phone to dial the number 7, for example, seven negative DC pulses are produced at a standard pulse rate of 10 Hz (Hertz). If the caller dials after connection to a called party, the DC pulses are differentiated by the inductive transmission line to the called party. The resulting wave form at the central station (called party) is a pair of closely spaced voltage spikes of opposite polarity corresponding to each DC pulse or digit of the caller's phone. At the telephone company exchange these pulses are of sufficient amplitude to operate stepping relays which determine the subsequent circuit connections. The dial click converter described herein in effect reconstructs from the inductively transmitted dial clicks the DC pulses originated by rotary dialing. The dial clicks are fed through an integrator circuit which is nonresponsive to higher frequencies, followed by a clipping circuit and a differentiator resulting again in the production of sharp voltage spikes. Voltage spikes of one polarity are selected by a diode, amplified and stepped up in voltage by a transformer and then fed by another clipping circuit to a schmitt trigger. The output of the schmitt trigger is a fixed voltage pulse which corresponds on a one-to-one basis with the original DC pulses. The schmitt trigger output triggers a monostable multivibrator having a pulse on-time of about 50 milliseconds and a natural repetition frequency of about 11.5 Hz. The pulse output of the multivibrator corresponds with the original DC pulses produced by the caller's dialing. The output of the monostable multivibrator operates an encoder which translates the digits represented by each pulse group into a paging signal which, when transmitted automatically turns on the designated paging receiver.

BRIEF DESCRIPTION OF THE DRAWINGS

FIG. 3 is a schematic diagram illustrating the telephone line coupler and audio routing circuit of FIG. 1 in more detail.

DESCRIPTION OF THE PREFERRED EMBODIMENT

Figure 1:
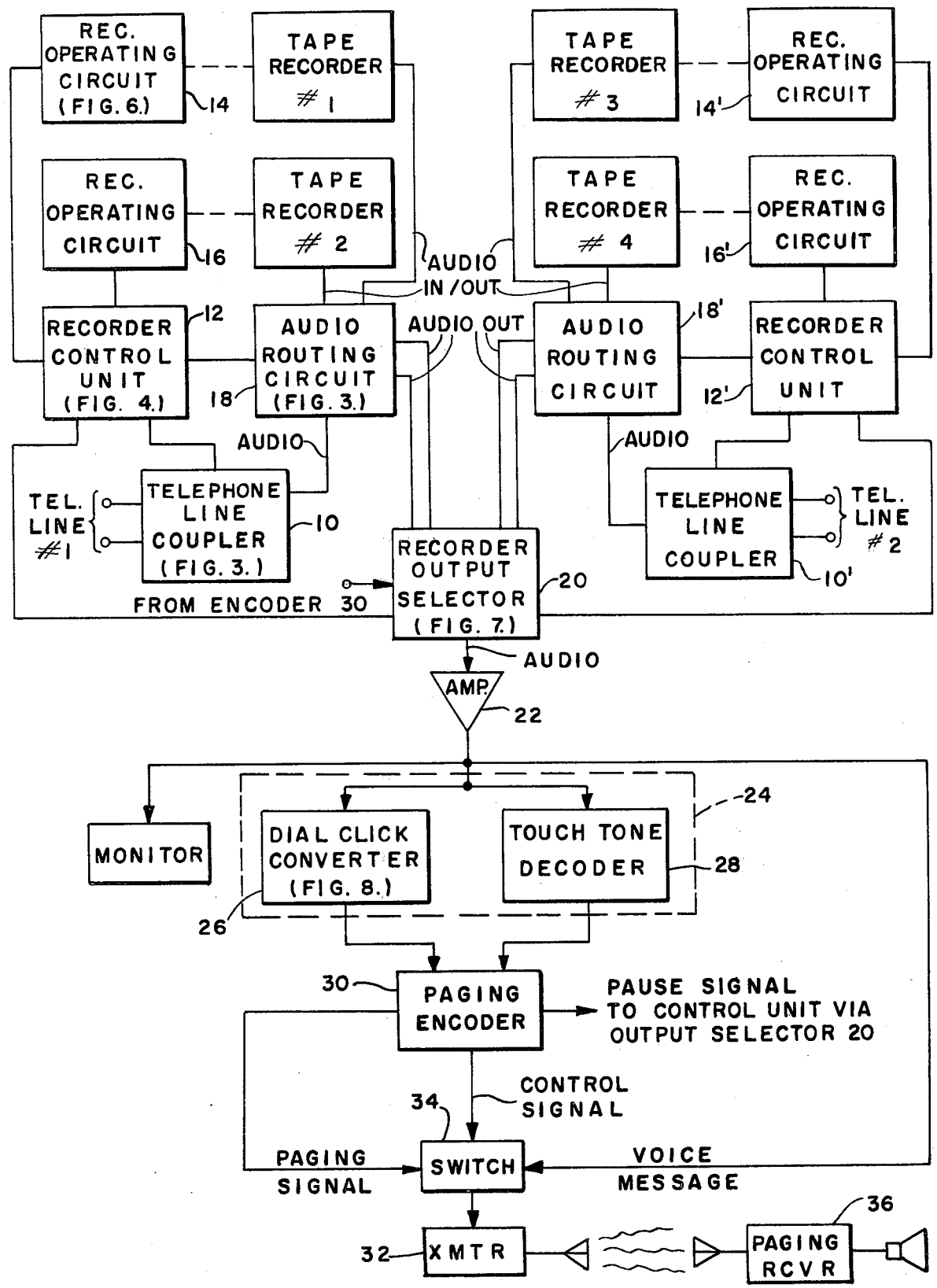
FIG. 1 is a block diagram illustrating a system according to the invention.

The system illustrated in FIG. 1 is designed to handle a plurality of simultaneous incoming calls. The telephone interconnect terminal serves two telephone lines. Telephone line No. 1 is serviced by tape recorders No. 1 and No. 2. Telephone line No. 2 is serviced by tape recorders No. 3 and No. 4. Telephone line No. 2 is automatically substituted for telephone line No. 1 if the latter is busy, by means of conventional, commercially available call transfer equipment. Calls on telephone line No. 1 are automatically connected to the telephone interconnect terminal by means of a line coupler 10. The line coupler 10 is connected to a recorder control unit 12 which provides control signals to recorder operating circuits 14 and 16 associated with the tape recorders No. 1 and No. 2 respectively. The operating circuits 14 and 16 each carry out the separate functions of stopping and starting the tape drive motor and switching from play to record.

One of the functions of the control unit 12 is to determine initially which recorder, No. 1 or No. 2, is to receive the incoming call. Once this is determined the audio connection must be established between the selected recorder and the telephone line No. 1. This connection is accomplished by the audio routing circuit 18. The routing circuit 18 also switches the telephone line No. 1 from the audio input to the audio output of a given recorder in response to control signals. After the caller has hung up and the caller's message is stored in the selected recorder, the audio output of the tape recorder is connected by the routing circuit 18 to a recorded output selector 20.

Telephone line No. 2 is handled by a separate system which, when receiving a cell, operates completely independently from the recorder system associated with the line No. 1. The components are substantially identical and are indicated by primed numerals corresponding to the reference numerals for the system associated with the tape recorders No. 1 and No. 2. Accordingly, for playing out the information stored in the tape recorders No. 3 and No. 4, an audio routing circuit 18' is provided which switches the audio outputs of these recorders to the recorded output selector 20. The output selector 20 accomplishes the time sharing of the remaining paging circuitry among the four tape recorders. For example, if tape recorder No. 1 is playing out stored information through the remaining circuitry, and tape recorder No. 2 is ready to play back such information, the selector 20 causes tape recorder No. 2 to wait until the page associated with the recorder No. 1 has been accomplished. Then, the tape recorder No. 2 is connected to the remaining circuitry via the routing circuit 18 and output selector 20. The output selector 20 is implemented to establish a predetermined priority among the tape recorders.

The audio output of the recorded output selector 20 is passed through an amplifier 22 to a decoding circuit 24 having both a dial click converter 26 and a TOUCH TONE decoder 28. The decoding circuit 24 is responsive to paging code information supplied by a coller having either the conventional rotary dial or TOUCH TONE phone. The touch tone decoder 28 is a conventional, commercially available unit. The dial click converter 26 is an unconventional circuit which will be described in detail below. Both the converter 26 and decoder 18 provide DC pulses, of the rotary dial type, which operate a commercially available paging encoder 30. A suitable encoder is marketed by Motorola under the model No. L09DAL0-360 (Paging Terminal). The first digit provided by either the decoder 28 or the converter 26 seizes the paging encoder 30 making it nonresponsive to the output of the other unit in the decoding circuit 24 to prevent spurious data originated in the alternate form from confusing the paging encoder. The paging encoder 30 converts a three digit page identification number into a two tone sequential paging signal which is passed to a radio transmitter 32 by a switch 34 controlled by the encoder 30. When the paging encoder 30 receives the third digit, a signal is sent to the recorder control unit 12 (or 12') which causes the tape recorder in use to stop between the paging code information and the caller's voice message. After a predetermined delay of sufficient length to allow the paging signal to be transmitted, the tape recorder is restarted to play out the voice message to the transmitter 32 through the switch 34. A paging receiver 36, designated by the paging code supplied by the caller, has a radio receiver whose audio portion is normally deactivated. The receiver, however, is responsive to the transmitted paging signal which activates the audio portion of the receiver and causes an alerting beep to be emitted, followed by the transmitted voice message.

Figure 2:
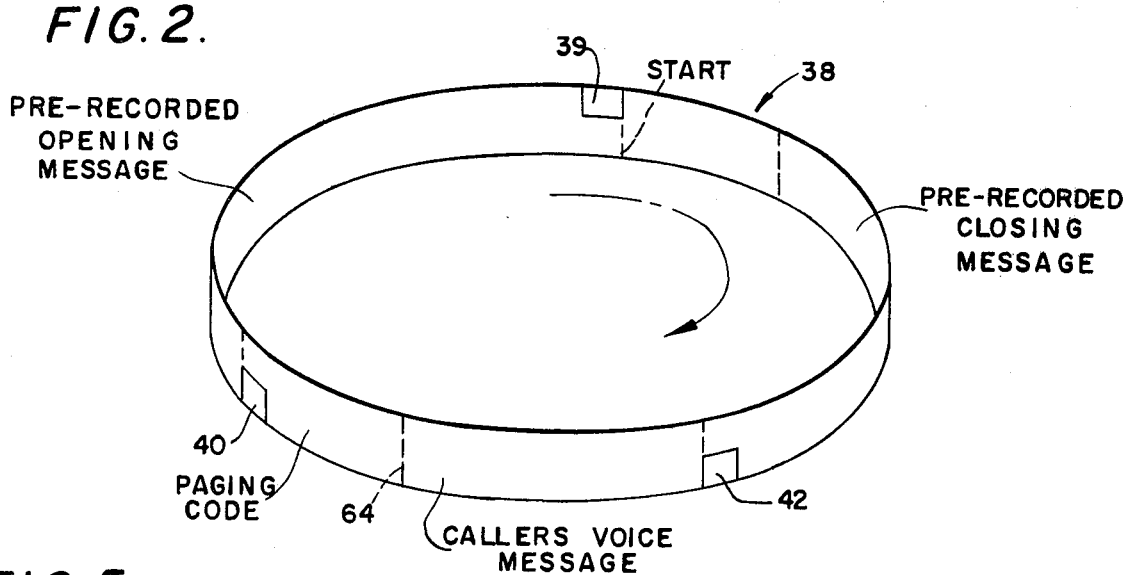
FIG. 2 is a perspective view of one of the tape loops used in the recorders of FIG. 1.

Each tape recorder is designed to operate a loop 38 of magnetic tape (FIG. 2). The tape loop is preferred since it makes reversal of the tape recorder motor unnecessary. The tape can be recycled in the same direction to any given position. As shown schematically in FIG. 2, each loop 38 is divided into three distinct sections. Beginning at the start position the first portion of the tape loop 38 contains a prerecorded opening message. This is what a caller, for example, on line No. 1, will hear after the line coupler 10 has connected the audio circuit to one of the tape recorders, No. 1 or No. 2; "Radio Telephone paging service. This is a recording. After you hear the tone you may dial your number code and then give your voice message. You will have 20 seconds." The start position corresponds to a first foil strip 39, located approximately on the upper half of the tape, which serves to ground a normally open, fixed, springy contact (S1, FIG. 6) urged against the tape. At the end of the prerecorded opening message, a first prerecorded 1000 Hz tone is produced lasting for about one-half second. The location of the first tone on the tape loop corresponds to a second foil strip 40, located approximately on the lower half of the tape, which serves to ground another normally open springy contact (S2, FIG. 6). After the first tone, the caller dials the special 3-digit number of the paging receiver that is assigned to the person he is paging. The tape loop does not stop after the paging code at this time. After the caller completes dialing these three digits, he speaks into the telephone and gives his message. The paging code and message are recorded as they are given. The tape recorder is changed over from play to record by means of the operating circuit 14 or 16 and recorder control unit 12 in response to the contact closure by means of the second foil strip 40. The portion of the 20-second record interval used for the paging code may vary. In fact, the entire 20 seconds may be used for providing the three digits, in which case the message will be omitted. At the end of the 20-second interval, the caller will hear a second 1000 Hz tone lasting for about one-half second, corresponding to the location of a third foil strip 42 on the lower half of the tape which cooperates with the control equipment to place the recorder back in the playing mode. The caller will then hear a prerecorded message as follows: "Your time is up. Your message has been recorded for transmission. Thank you for calling. Please hang up."

FIGS. 3–7 represents an embodiment of the automatic control systems used in the invention. In this embodiment, switching functions are implemented by means of relay circuits. Conventional notation has been adopted for indicating which switch is operated by which relay coil. For example, switch K20A is operated by relay coil K20. In the drawings the connection between the relay coil and the switch operated thereby is omitted. Unless otherwise indicated electrical ground is positive throughout the relay circuitry. The control circuits for telephone lines Nos. 1 and 2 are substantially symmetrical. The circuits shown in FIGS. 3–6 are associated with telephone line No. 1. The corresponding control circuits for telephone line No. 2 are implemented in a similar manner. The circuits of FIGS. 3–7 will be described from an operational standpoint as this is believed to be the most intelligible means of explaining the circuitry. The electrical connections in the circuits of FIGS. 3–7 will not be described in detail as the circuit diagram is sufficient in this regard. The use of resistors, capacitors and diodes within the relay circuits is conventional unless otherwise specified. All of the relay switches are shown in the circuit diagrams in their normal condition, i.e., the position of the associated switch when the relay coil is not energized. The circuitry is illustrated in the initial mode; all of the recorders are free awaiting a call.

Figure 4:
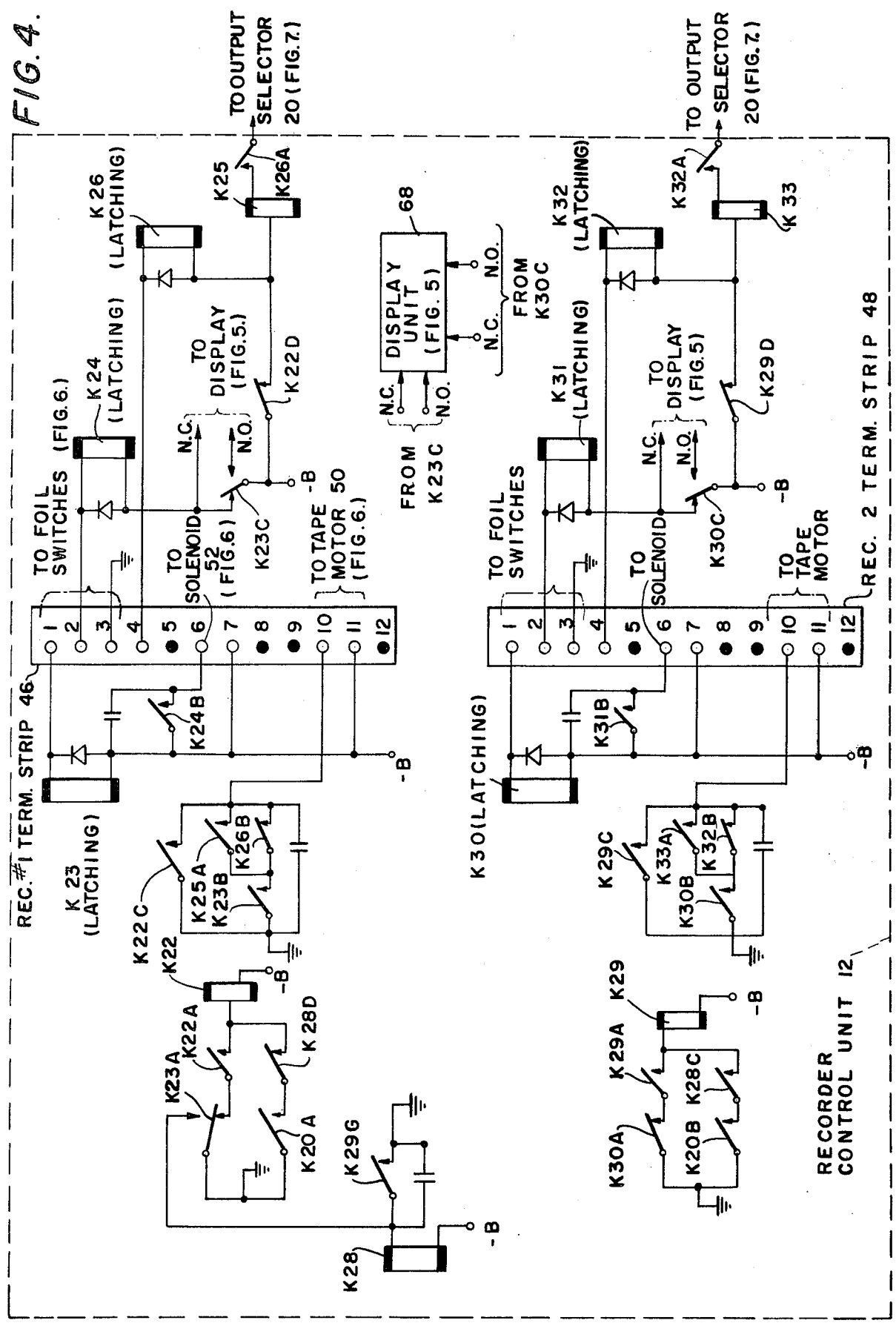
FIG. 4 is a schematic diagram illustrating one of the recorder control units of FIG. 1 in more detail.

In FIG. 3 the line coupler 10 includes a relay coil K20 which is energized briefly by the ringing signal of an incoming call on the telephone line No. 1. The line No. 1 is coupled to the primary winding of an audio transformer 44 via a pair of parallel relay switches K22B and K29B which are operated indirectly by the relay K20. In FIG. 4 the relay coil K22 is connected to ground through a normally closed relay switch K28D and a normally open relay switch K20A. When the relay coil K20 is energized, the switch K20A closes, energizing the relay coil K22. The relay coil K22 is connected in an alternate path to ground via its own switch K22A and a normally closed switch K23A so that the coil K22 remains energized following the ringing signal. Energizing the coil K22 causes the relay switch K22B (FIG. 3) to couple the telephone line No. 1 to the primary winding of the transformer 44.

Figure 6:
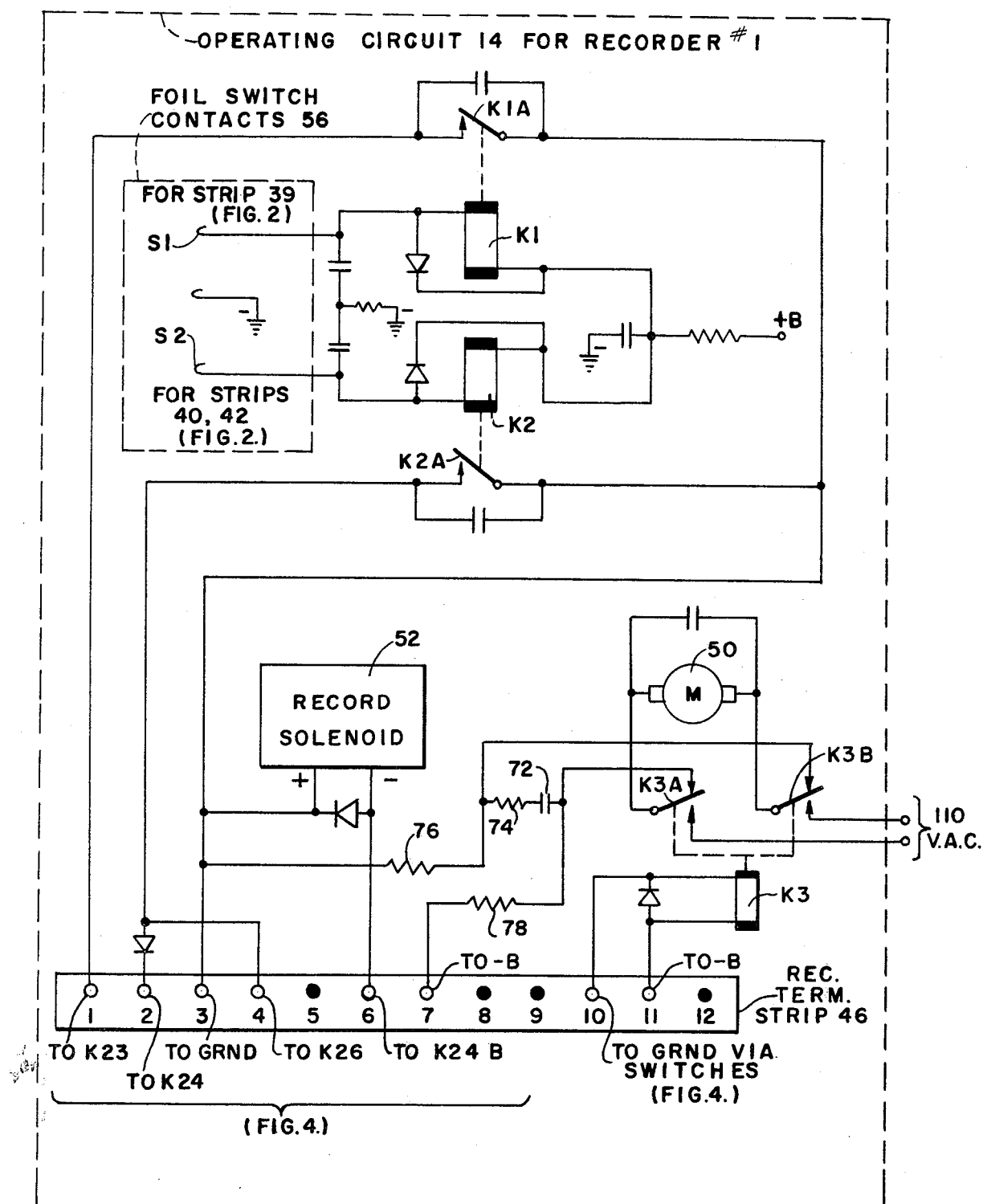
FIG. 6 is a block and schematic diagram illustrating one of the recorder operating circuits of FIG. 1 in more detail.

A pair of terminal strips 46 and 48 (FIG. 4) for the tape recorders No. 1 and No. 2 respectively provide the interconnections between the recorder control unit 12 and the two tape recorder operating circuits 14 and 16. The operating circuit 14 with the terminals trip 46 is shown in detail in FIG. 6. The other operating circuit 16 with strip 48 is identical. In the circuit 14, an AC synchronous motor 50 is mechanically connected to a conventional tape drive capstan assembly (not shown). The motor 50 can be connected through a pair of ganged relay switches K3A and K3B to a 110 volt AC line. The relay coil K3 is connected to the terminals 10 and 11 on the strip 46. When the coil K22 in FIG. 4 is energized, the relay switch K22C closes the connection of the terminal 10 to ground. The terminal 11 is always connected to a source of negative DC voltage, —B. Thus the coil K3 in FIG. 6 is energized, throwing the switches K3A and K3B which connect the motor 50 to the AC line, starting the tape recorder No. 1. The operating circuit 14 of FIG. 6 also includes a record solenoid 52 connected for energization to the terminals 3 and 6 of the strip 46. When the solenoid 52 is energized, the recorder No. 1 is changed from its normal play mode of operation to the record mode. The magnetic play and record heads (not shown) are switched mechanically in the conventional manner. Accordingly, when the motor 50 begins to drive the tape from the tape's start position (FIG. 2), the prerecorded opening message on the tape is played out.

The audio routine circuit 18 (FIG. 3) is designed so that initially or normally the audio output of the No. 1 recorder is connected to the secondary winding of the transformer 44 via an audio amplifier 54. The amplifier 54 is necessary to provide sufficient volume so that the caller will hear and understand the prerecorded messages. The tape loop 38 of FIG. 2 driven by the motor 50 completes the opening message and the foil strip 40 proceeds into engagement with foil switch contacts 56 of FIG. 6. It should be noted that the foil strip 40 does not have to be located on the loop 38 precisely at the end of the opening message since the contacts 56 may be displaced from the record and play heads. The contacts 56 are mounted on the recorder and arranged such that contact S2 will be interconnected with the grounded contact when the foil strip 40 (or 42) passes by, and similarly contact S1 will be grounded by the passage of the other foil strip 39 at the start position. When contact S2 is grounded by the strip 40 a relay coil K2 in circuit with contact S2 is energized, closing the relay switch K2A, which causes the terminal 2 of the terminal strip 46 to be connected to the grounded terminal 3. This interconnection causes a latching relay coil K24 in the control unit 12 (FIG. 4) to be energized, thus throwing relay switch K24A of the audio routing circuit 18 (FIG. 3). Switch K24A connects the telephone line to the audio input of the recorder No. 1. At the same time, the switch K24B of the control unit 12 (FIG. 4) is closed connecting the terminal 6 to —B which causes the record solenoid 52 of the operating circuit 14 (FIG. 6) to be energized, switching the tape recorder No. 1 to the record mode. The motor 50 continues to operate while the caller dials in the paging code and leaves his voice message. The latching relay K24 is an impulse type relay. Each time the coil is pulsed, the associated relay switches are thrown to the alternate position. A suitable impulse relay is marketed by Potter-Brumfield under model No. AP17D.

After the 20 second record interval has elapsed, the foil strip 42 (FIG. 2) grounds the foil switch contact S2 energizing the coil K2 which closes a relay switch K2A interconnecting terminals 2 and 3 of the terminal strip 46, which pulses the coil K24 again. Switches K24A (routing circuit 18, FIG. 3) and K24B return to their normal state.

The loop continues to be driven by the tape motor 50 in the play mode after the caller has been advised to hang up. The tape loop proceeds to the start position corresponding to the foil strip 39 whereupon the switch contact S1 is grounded interconnecting the terminals 1 and 3 of the terminal strip 46 via the relay K1. In FIG. 4, interconnecting terminals 1 and 3 of strip 46 energizes the latching, impulse type relay coil K23. The switch K23A moves to its alternate position, deenergizing the coil K22. In the circuit for the motor 50, the switch K22C opens, but the motor continues to run since the switch K23B has closed the alternate ground connection via the normally closed switch K26B.

Thus the tape loop 38 runs through the start position, still in the play mode, until the foil strip 40 reaches the contacts 56 (FIG. 6) at the beginning of the caller's recording. This time, because the relay coil K22 is deenergized, the relay switch K22D is in its normally closed position in the circuit of the latching, impulse relay coil K26 connected to the terminal 4, which is hard wired to the terminal 2. Energization of the coil K26 causes the normally closed relay switch K26B (in the motor circuit) to open, thus breaking the connection of the terminal 10 to ground which stops the tape motor 50.

At this point, then, the recorder No. 1 is in condition to play back the caller's recorded information. The recorder will hold in this position until the recorded output selector 20 (FIG. 7) determines that the transmitter is available for recorder No. 1.

Let us assume in the meantime that another call comes in on telephone line 1 while recorder No. 1 is in use. The control unit 12 is implemented so that the recorder No. 2 will now be available to be coupled to the telephone line No. 1. When the relay coil K23 latched as the tape went through the start position, the relay switch K23A was thrown to its alternate position, which, besides breaking the circuit for energizing coil K22, also energized a coil K28. Back in the audio routing circuitry 18 (FIG. 3) the relay switch K28E is thrown from its normal position to couple the audio output line of the recorder No. 2 to the telephone line No. 1 through the audio amplifier 54. In the control unit 12 (FIG. 4) another relay coil K29, corresponding to the coil K22, must be energized in order to couple the telephone line No. 1 to the primary winding of the transformer 44. The coil K29 is connected by two alternate routes to ground, one of which is by way of the now closed relay switch K28C and a series switch K20B which closes briefly when the incoming call is received by the line coupler 10 (FIG. 3). As soon as the coil K29 is energized, its own switch K29A latches the coil through the normally closed switch K30A to ground. Energization of the coil K29 closes the relay switch K29B which actually connects the line No. 1 to the transformer 44. At the same time the relay switch K29C starts the tape recorder motor for the second recorder.

The operation of the recorder No. 2 from here on is identical to that of the first recorder. Let us assume now that the second caller has left his message and the second recorder has been halted at the start of the second caller's recording and is holding for access to the transmitter. A third call on telephone line No. 1 cannot be received therefore by either recorder No. 1 or No. 2. A busy signal is caused by the telephone line coupler 10 (FIG. 3). Two series connected switches K23D and K30D are closed as the tape loops pass through the start positions to close the telephone line circuit in a manner which will produce a busy signal. Actually in the preferred system, a third call would be transferred automatically to line No. 2. Thus, a busy tone would occur only if all four recorders were in use.

Figure 7:
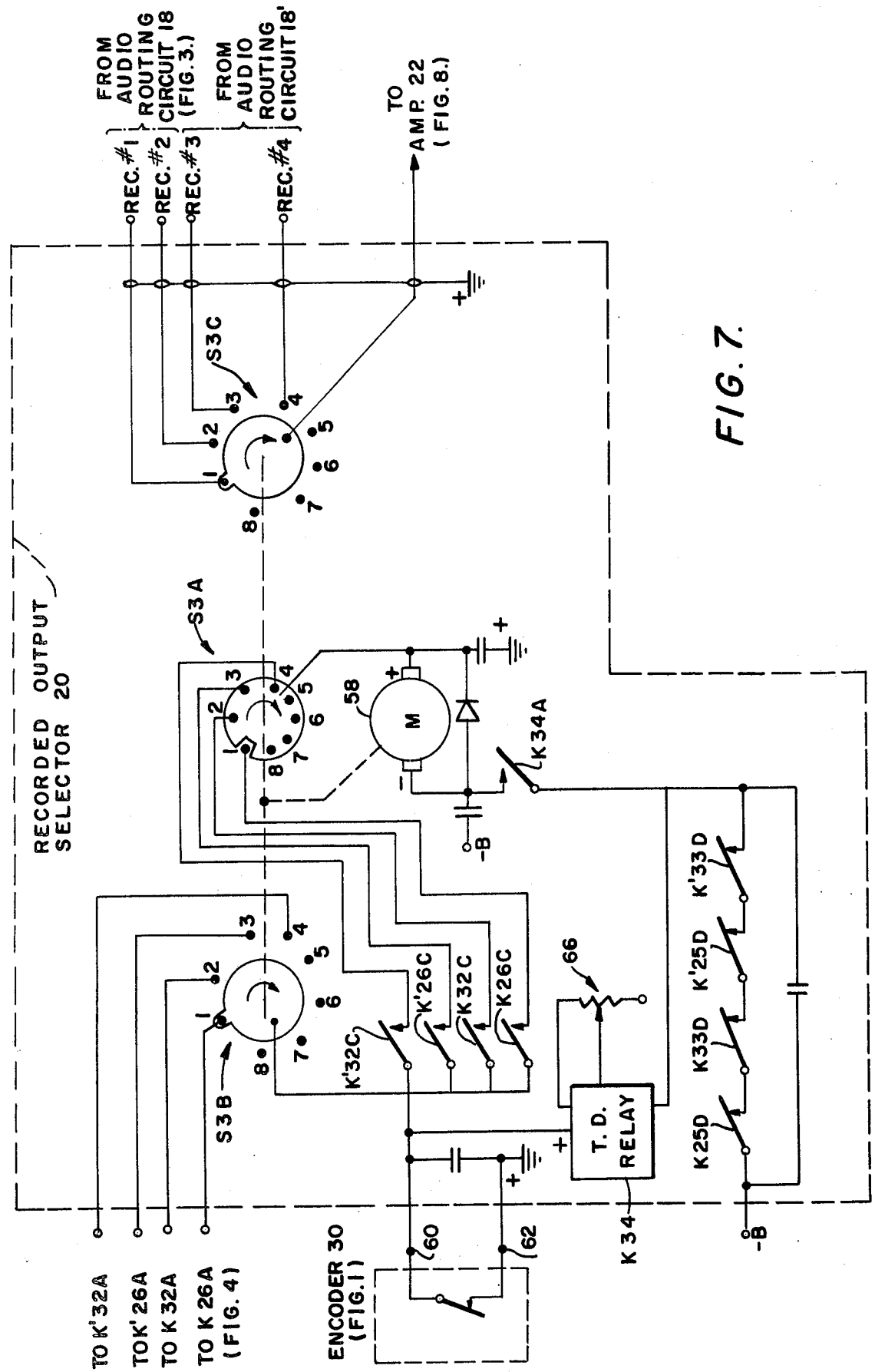
FIG. 7 is a schematic diagram illustrating the recorded output selector of FIG. 1 in more detail.

Control of a given recorder with a stored message is taken over by the recorded output selector 20, shown in detail in FIG. 7. The central control element of the selector 20 is a three deck (S3A, S3B, S3C) rotary switch driven by a DC motor 58. The motor 58 is designed to operate the rotatable contacts of the switches only when seeking a stored recording. Once the recorder with a stored message is connected to the paging circuitry, the motor 58 stops.

The rotary switch S3B operates the tape recorder motors, for example, motor 50 for recorder No. 1. The switch S3A operates the rotary switch motor 58; and the switch S3C routes the audio to the remaining paging circuitry.

Continuing with the operation, when coil K26 was energized, and the switch K26B simultaneously opened, stopping the motor 50 for tape recorder No. 1 at the start of the stored message, the switch K26A was closed in the circuit for coil K25 causing it to become energized. In FIG. 7, the switch K26A is connected through the rotary switch S3B to ground. The contacts 60 and 62 are normally interconnected by the encoder 30. Thus, the relay coil K25 is energized restarting the tape motor 50 via switches K25A and K23B.

Since the rotary switches were already in the first position, it was not necessary to run the motor 58. The notch on the rotatable contact of the switch S3A was over the fixed contact 1 leading to the closed (grounded) switch K26C. Had the rotary switch been left in a different position, the grounded switch K26C would have been connected in circuit with the motor 58 by the switch S3A. The motor 58 would run until the notch coincided with the "live" fixed contact.

Four normally closed switches K25D, K33D, K'25D and K'33D are connected in series with the motor 58 circuit. The switches K'25D and K'33D are corresponding switches in the control unit 12' (not shown) for recorders Nos. 3 and 4. This arrangement prevents the switch S3A from starting the motor when the notch already coincides with a live contact and another one of the recorders becomes ready to play back information, i.e., another one of the switches K26C, K32C, K'26C and K'32C closes. Since, in this case, the coil K25 has been energized, starting the tape motor 50, the switch K25D was opened at the start of the stored message to prevent further operation of the rotary switch motor 58.

The switch S3C is also shown in the corresponding correct position to connect the audio from the recorder No. 1 to the amplifier 22 (FIG. 1). Note that in the audio routing circuit 18 (FIG. 3), the switch K25E has been thrown. Since the switch K24A is in its normal position, the audio output of the recorder No. 1 is connected through switches K24A and K25E to the output selector 20 at terminal 1 of the switch S3C.

At this point the tape motor 50 is running the recorder. The solenoid 52 is not activated; the recorder is in the play mode. Accordingly, the caller's stored audio message, beginning with the dialed digits, is played back through the amplifier 22. In FIG. 1 the decoding circuit 24 provides the paging encoder 30 with the DC pulses corresponding to the paging code. The operation of the special dial click converter 26 is described in detail below.

As soon as the encoder 30 has processed the last (third) digit of the paging code, it disconnects the terminals 60 and 62 in the output selector 20 of FIG. 7. Since the terminal 60 is connected via the switch S3B to the switch K26A in circuit with the coil K25, the coil K25 is deenergized. The switch K25A opens, stopping the tape motor 50. The tape loop 38 is halted between the code and voice message at position 64 (FIG. 2). The encoder 30 finishes producing the two tone sequential paging signal, which is transmitted by the transmitter 32, recloses contacts 60 and 62 and causes the coil K25 to be energized again. The energization of the coil K25 starts the tape motor 50.

The loop 38 is now driven into the voice message portion of the recording. The switch 34 (FIG. 1) responsive to the end of the paging signal causes the audio from the recorder No. 1 to be connected directly to the transmitter 32, bypassing the decoding/encoding circuitry. If the designated paging receiver 36 is in the area and operating, its receiver will have been turned on by the paging signal and the caller's recorded voice message will be heard.

The page is completed when the loop 38 comes to the end of the recorded message, corresponding to the foil strip 42, which briefly interconnects terminals 2 and 4 to the grounded terminal 3. The coil K24 cannot be pulsed again since the switch K23C is in its alternate position; but the coil K26 does receive a pulse which causes it to reverse its associated switches. In particular, the switch K26A is again opened which causes the coil K25 to become deenergized. In the audio routing circuit 18, the switch K25E returns to its normal position ending audio/transmission. In the tape motor circuit the positions of the switches K25A and K26B are reversed so that the motor 50 continues to run. The tape loop 38 thus proceeds to the start position. The first foil strip 39 interconnects the terminals 1 and 3 of the strip 46, pulsing the relay coil K23. The coil K23 reverses its condition, and its associated switches return to normal. In particular, the switch K23B opens and stops the motor 50 at the start position. The switch K23A, now in the normal position, again offers the recorder No. 1 for servicing the next call.

If there are other recorders with stored messages awaiting access to the transmitter, upon completion of the first page, the rotary switch motor 58 is activated by the switch S3A to seek the next live contact. If no other messages have been stored, the rotary switches will remain at the first position. It should be noted that each rotary switch has eight fixed contacts. Only four of these are used by the system of FIG. 1, two corresponding to each of two telephone lines. But one or two more telephone lines may be added with a pair of recorders and associated circuitry for each. Of course, the number of recorders possible can be increased indefinitely by using rotary switches with more contacts.

In FIG. 7 a slow operating time delay relay K34, with a variable resistor 66 for setting the delay, controls a normally open switch K34A in series with the circuit of the rotary switch motor 58. The purpose of this arrangement is to delay the motor activation to insure that the encoder 30 has completely reset itself. The encoder's automatic reset time is typically about one second.

Figure 5:
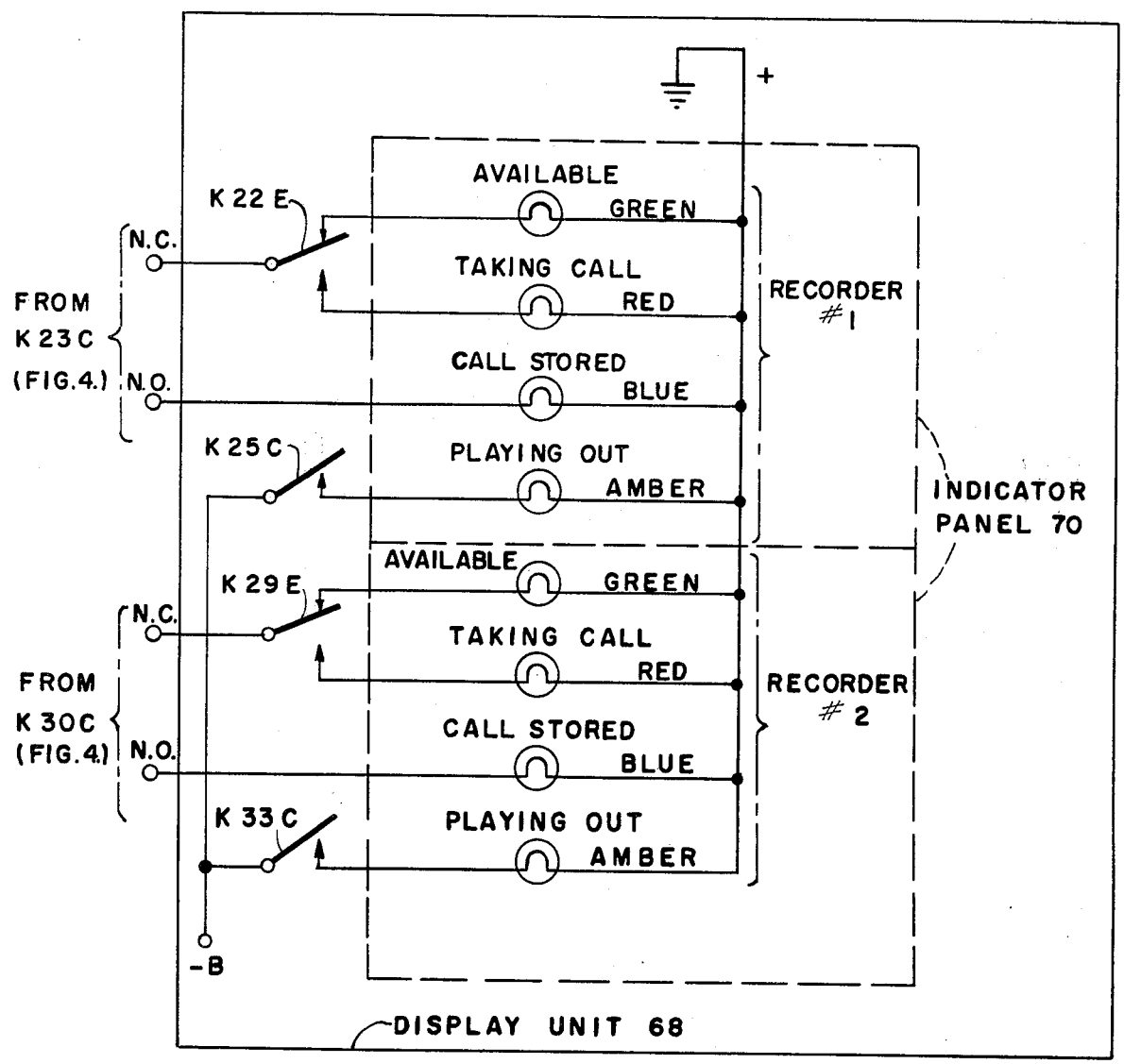
FIG. 5 is a schematic diagram illustrating the display unit of FIG. 4 in more detail.

As shown in FIGS. 4 and 5, a display unit 68 is provided for indicating the condition of recorders Nos. 1 and 2. A similar unit is incorporated in the corresponding control unit 12' (not shown) for recorders Nos. 3 and 4. The display unit 68 includes an indicator panel 70 divided into two sections. Each section is furnished with four lights of different colors corresponding to the four recorder conditions: "available," "taking call," "call stored," and "playing out." In FIG. 5 the notations "N.C." and "N.O." refer to the normally closed and normally open contacts of the specified relay switches. The electrical connections and operation of the display unit 68 are self-explanatory from FIGS. 4 and 5 in view of the above circuit descriptions.

The recorder operating circuit 14 also includes an electrodynamic braking circuit for the tape recorder motor 50. When the encoder 30 causes the tape loop 38 to pause between the recorded code digits and voice message during play-back, the motor 50 must stop quickly without coasting to prevent any of the voice message from being lost. In FIG. 6, when the coil K3 is deenergized, the switches K3A and K3B return to their alternate, normal positions to connect the motor 50 to the DC supply across terminals 3 and 7 of the terminal strip 46 via a resistive-capacitive circuit. The circuit includes a capacitor 72 and resistor 74 in series with each other connected in parallel across the leads to the motor 50. While the motor 50 runs, the capacitor 72 is charged to a predetermined voltage through a pair of resistors 76 and 78 in series with the respective connections to the terminals 3 and 7. When connected by the switches K3A and K3B, the capacitor 72 rapidly discharges through the windings of the motor 50. The DC current flow produces a non-rotating field which causes the motor armature to stop quickly. The braking circuit insures that no significant word part is lost before the tape audio is connected directly to the transmitter 32 for relaying the voice message.

Figure 8:
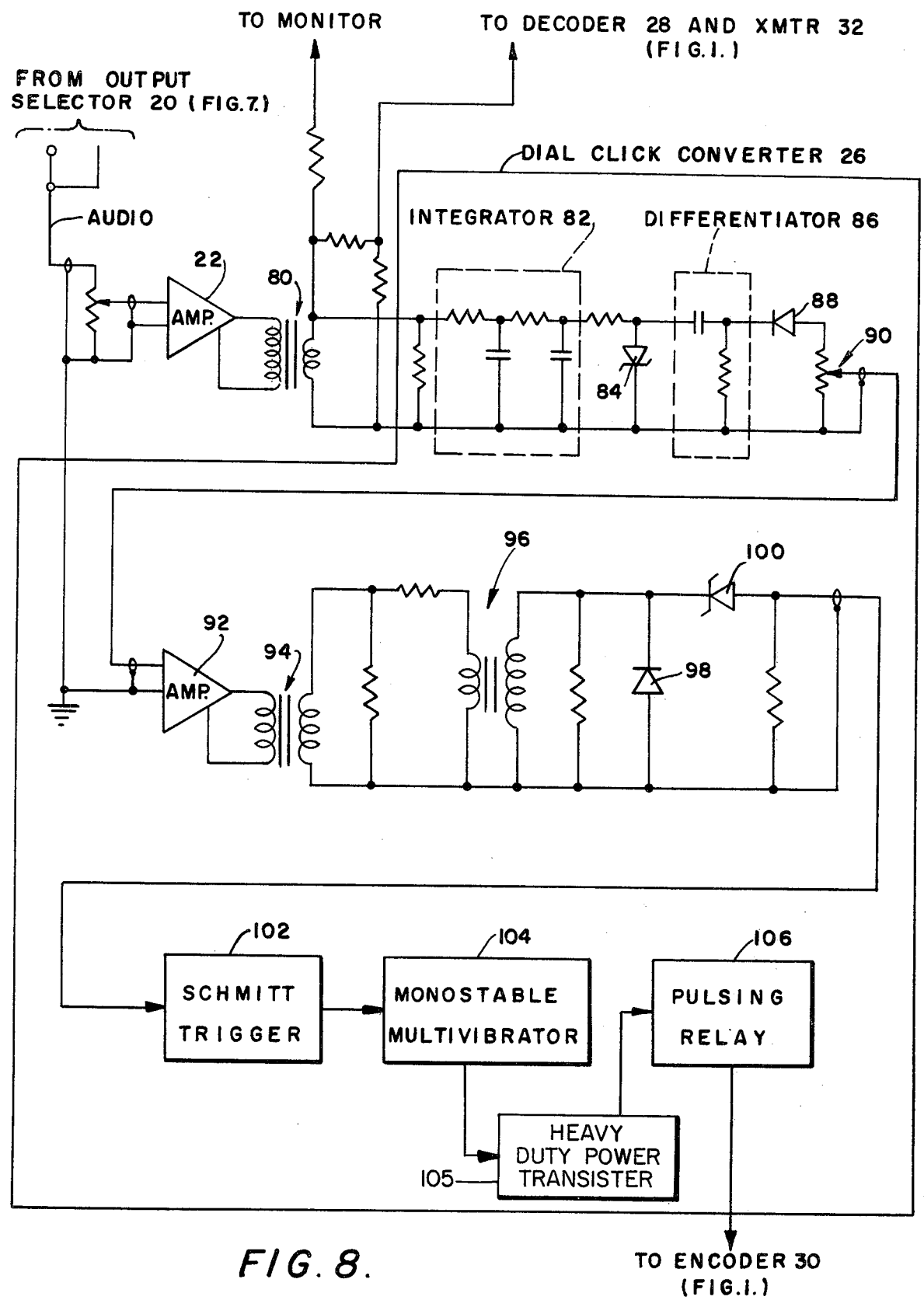
FIG 8 is a schematic and block diagram illustrating the dial click converter of FIG. 1 in more detail.

The details of a preferred embodiment of the dial click converter 26 are illustrated in FIG. 8. The output of the audio amplifier 22 is passed through an output transformer 80. The output of the transformer 80 is distributed by means of a voltage divider circuit to the TOUCH TONE decoder 28, transmitter 32, audio monitor (if desired), and dial click converter 26. In the converter 26 the signal first encounters an integrator 82 comprised of series resistors and parallel capacitors. The dial clicks have a low repetition rate of about 10 Hz. They are passed by the integrator 82 while most of the higher frequency components are filtered out. The dial clicks emerge from the integrator 82 attenuated and leveled off. A parallel connected Zener diode 84 removes all of the positive portion of the signal from the integrator 82 and clips off the negative portion in excess of the breakdown voltage. The outcome is similar to a negative square wave. Next, this signal enters a differentiator circuit 86 comprising a series capacitor and parallel resistor. A reverse-biased silicon diode 88 passes only the negative portion of the differentiated signal. A potentiometer 90 provides a variable gain control across which sharp negative pulses appear. These negative pulses are then amplified and inverted by an amplifier 92 and passed via an output transformer 94 and resistive network to a step-up transformer 96 where the pulses receive increased amplitude. Any negative portion remaining is clipped off by a parallel silicon diode 98. The diode 98 and resistive network associated with the transformer 96 also serve to reduce inductive surges. Next, the signal is clipped by a series connected Zener diode 100 which passes only that part of each positive pulse which exceeds the breakdown voltage. This procedure causes any remaining voice audio or miscellaneous random pulses of smaller amplitude to be removed from the waveform.

The pulses are next passed to a Schmitt trigger circuit 102. The pulses arriving at the circuit 102 correspond on a one-to-one basis with the original DC dial pulses, but vary greatly in amplitude depending on the circuit connections between the caller's phone and the central station. It is for this reason that extensive gain must be provided by the amplifiers 22 and 92. It is essential that the pulses of higher amplitude not be clipped or limited in any way. Signal compression must be avoided so that the pulse amplitude remains in excess of the weaker signals to preserve the signal to noise ratio. At the same time, the weaker dial clicks from more distant telephones must be amplified sufficiently.

The Schmitt trigger 102 is a conventional circuit providing pulses of uniform amplitude in response to input pulses of varying amplitude. The standard amplitude pulse output of the trigger 102 operates a conventional monostable multivibrator 104, often referred to as a "one-shot," producing one square wave pulse for every trigger pulse from the Schmitt trigger 102. The pulse width of the multivibrator 104 is predetermined in the conventional manner at about 50 milliseconds, equivalent to the duration of the original current pulse from a telephone dial. This is required by the encoder 30 which is designed to respond to standard dial pulses. This pulse width is also critical because the multivibrator 104 has a natural repetition frequency which can be affected if the pulses are too short or too long. The repetition rate should be established at about 10 Hz, equal to the standard dial pulse repetition rate. In actual practice 11.5 Hz (15% higher than the standard rate) has produced the best results. Since the multivibrator 104 cannot oscillate faster than 11.5 Hz, faster trigger pulses will not operate the multivibrator in a one-to-one correspondence. Therefore, the natural repetition frequency in effect provides an additional discriminating function, in screening out or, at least, "miscoding" higher frequency trigger pulses. The multivibrator 104 normally produces a negative square wave output. This output can be directly converted by a suitable heavy duty power transistor 105 to a negative square pulse of current to operate a conventional pulsing relay 106. The relay 106 reproduces the pulse train corresponding to each dialed digit in perfect square wave form to operate the encoder 30. If desired, the relay 106 may be omitted and the multivibrator output, in current form, used to drive the encoder 30 directly.

Inside the conventional encoder 30, stepping relays respond to the pulse trains to determine the corresponding two tone sequential paging signal for transmission. Thus the encoder operates in a sense as an addressable read only memory. The paging tones normally consist of one tone lasting for 1.2 seconds followed by a second tone lasting 2.5 seconds. The designated paging receiver 36 (FIG. 1) responds to these tones as described previously.

It should be noted that the encoder 30 will not respond to TOUCH TONE originated pulses, once it has begun to process rotary dial originated pulses, and vice versa. This is accomplished within the encoder 30 by automatically disconnecting the decoder 28 from the encoder, when the encoder is responding to rotary dial originated pulses, and vice versa.

Those skilled in the art will recognize that other means of implementing the control circuitry for handling the recorders of FIG. 1 are possible, the one described herein being a preferred implementation. Other analog audio recording instruments could be used besides the tape loop system. The dial click converter 26 is useful in other circuits besides the specific paging system described herein. For example, the converter 25 can be used to operate automatic mobile telephone equipment, telephone controlled dictating machines and other telephone interconnected dial systems.

It is also possible to incorporate an automatic printing system operated through the control circuitry to provide a running record of the pages transmitted and recorders employed. In addition, a repeat system can be easily incorporated to cause the recorded page to be repeated through the decoding/encoding circuitry and transmitter after a predetermined delay.

The described paging system offers an unprecedented degree of flexibility compared to prior art systems. Audio recording of code digits and voice message left by the caller provides a storage system enabling a single paging encoder and transmitter to handle multiple calls. From the caller's standpoint the paging procedure is uncomplicated. A single tape location is provided for the code and message. The decoding circuit 54 with converter 26 provides reliable operation by rotary dial as well as TOUCH TONE telephones. Moreover, once a given system is installed, the service can be expanded by adding parallel systems on call transfer lines without altering the original equipment in any way. All connections for the new equipment within the system are via the output selector 20.

It will be understood that various changes in the details, materials, steps and arrangements of parts which have been herein described and illustrated in order to explain the nature of the invention, may be made by those skilled in the art within the principle and scope of the invention as expressed in the appended claims.

I claim:
1. A dial click to pulse converter, comprising audio circuit means adapted to receive audio telephone line signals for producing output pulses of varying amplitude corresponding to inductively transmitted dial clicks originated by dial pulses produced by a caller's rotary dialing after interconnection between the caller and a called party, trigger circuit means for producing output pulses of uniform amplitude in response to said circuit means output pulses of a predetermined polarity and minimum amplitude, monostable multivibrator means for producing output pulses of uniform amplitude and predetermined pulsewidth in response to said trigger circuit output pulses, said multivibrator means having a maximum repetition frequency about 0 to 30 percent higher than the nominal standard frequency for pulses originated by rotary dialing.

2. The converter of claim 1, wherein said circuit means includes a first audio amplifier adapted to receive said telephone line signals, means for integrating the output of said amplifier, means connected to receive the integrating means output for passing a clipped waveform of one polarity, means for differentiating said waveform, diode means connected to receive the differentiating means output for restriction thereof to one polarity, and discriminator means operatively connected to receive the output of said diode means for passing that portion in excess of a predetermined amplitude level to produce said circuit means output pulses.

3. The converter of claim 2, wherein said circuit means further includes a second audio amplifier connected to receive the diode means output and a step-up pulse transformer driven by said second amplifier for producing the input to said discriminator means.

4. The converter of claim 1, wherein said predetermined frequency is about 15% higher than said standard frequency for rotary dial originated pulses.

5. The converter of claim 1, wherein said predetermined frequency is about 11.5 Hz.

6. The converter of claim 1, wherein said predetermined pulsewidth is determined in accordance with the desired maximum repetition frequency of said multivibrator means.

7. The converter of claim 1, wherein said maximum repetition frequency is about 10–20 percent higher than said nominal frequency.

8. The converter of claim 1, wherein the pulsewidth of said multivibrator means corresponds to that of nominal dial pulses produced by rotary dialing.

9. The converter of claim 8, wherein said maximum frequency is about 11.5 Hertz and the pulsewidth of said multivibrator means is about 50 milliseconds.

10. A dial click to pulse converter, comprising audio input means for receiving audio telephone line signals including signals in the form of inductively transmitted dial clicks originated by dial pulses produced by a caller's rotary dialing after interconnection between the caller and a called party and for producing output pulses of varying amplitude corresponding to said dial clicks, integrator means for attenuating the higher frequency portion of said output pulses, first Zener diode means operatively connected in parallel with the output of said integrator means for producing a clipped output of a single polarity, differentiator means for differentiating the first Zener diode means output, first diode means connected to the differentiator means output for restricting said output to a single polarity, amplifier means for amplifying the output of said first diode, step-up transformer means for raising the voltage of the output of said amplifier means, second diode means connected to receive the output of said step-up transformer means for restricting said output to a single polarity, second Zener diode means connected in series with the output of said second diode means to pass only pulses of a single polarity in excess of a threshold voltage for amplitude discrimination, Schmitt trigger means operatively receiving the output of said second Zener diode means for producing a trigger output of uniform amplitude in response to an input from said second Zener diode means of predetermined polarity and sufficient amplitude; and one-shot means responsive to said Schmitt trigger means for producing a pulse output of uniform amplitude and predetermined pulsewidth, said one-shot means having a maximum repetition frequency 0–30 percent higher than nominal standard repetition frequency for dial pulses originated by rotary dialing.

11. The converter of claim 10, wherein said maximum frequency is about 10–20 percent higher than said nominal frequency.

12. The converter of claim 10, wherein said maximum frequency is about 15 percent higher than said nominal frequency.

13. The converter of claim 10, wherein said maximum frequency is about 11.5 Hertz.

14. The converter of claim 13, wherein said predetermined pulsewidth is about 50 milliseconds.

15. The converter of claim 10, further comprising resistive network means opertively connected to said step-up transformer means for reducing inductive surges associated therewith.

16. The converter of claim 15, wherein said step-up transformer means includes primary and secondary windings, said resistive network means including a resistive element connected in series with said primary winding and another resistive element connected in parallel across said secondary winding, said second diode means being connected in parallel with said secondary winding and said other resistive element to aid in reducing inductive surges.

17. A dial click to pulse converter, comprising audio amplifier means connected to receive audio telephone line signals including signals in the form of inductively transmitted dial clicks originated by dial pulses produced by a caller's rotary dialing after interconnection between the caller and a called party, low pass filter means operatively connected to receive the output of said audio amplifier, parallel Zener diode means receiving the output of said low pass filter for producing a clipped waveform of one polarity, means for differentiating the output of said parallel Zener diode means, means for increasing the level of said differentiating means output, discriminator means for passing that portion of the increased amplitude greater than a predetermined threshold, and one-shot means responsive to a predetermined level of the output of said discriminator means for producing output pulses of uniform amplitude and predetermined pulsewidth, said one-shot means having a maximum pulse repetition frequency about 0 to 30 percent higher than the nominal standard frequency for pulses originated by rotary dialing.

18. The converter of claim 17, wherein said maximum frequency is 10–20 percent higher than said nominal frequency.

19. The converter of claim 17, wherein said maximum frequency is about 15 percent higher than said nominal frequency.

20. The converter of claim 17, wherein said maximum frequency is about 11.5 Hertz.

21. The converter of claim 17, wherein said predetermined pulsewidth is about 50 milliseconds.

22. The converter of claim 17, further comprising diode means connected between said differentiating means and said level increasing means for restricting said differentiating means output to one polarity.

23. The converter of claim 17, wherein said discriminator means includes a series connected Zener diode.

24. The converter of claim 17, further comprising Schmitt trigger means connected between said one-shot means and the output of said discriminator means for producing output pulses of uniform amplitude to trigger said one-shot means in response to input pulses greater than a predetermined threshold level.

* * * * *

UNITED STATES PATENT OFFICE
CERTIFICATE OF CORRECTION

Patent No. 3,995,121                    Dated   November 30, 1976

Inventor(s)   Royal F. Alvis

It is certified that error appears in the above-identified patent and that said Letters Patent are hereby corrected as shown below:

Column 1, line 41, "to" should read --by--.

Column 2, line 44, "7" should read --"7"--, lines 64, 65 and 67, "schmitt" should read --Schmitt--.

Column 3, line 64, "cell" should read --call--.

Column 4, line 22, "coller" should read --caller--, line 28, "18" should read --28--, line 61 should read as follows: --FIG. 2, each tape loop 38 is divided into three distinct sec---.

Column 6, line 40, "routine" should read --routing--.

Column 14, line 55 (claim 21), "17" should read --20--.

Signed and Sealed this

Fourteenth Day of June 1977

[SEAL]

Attest:

RUTH C. MASON
*Attesting Officer*

C. MARSHALL DANN
*Commissioner of Patents and Trademarks*